US010973366B2

(12) United States Patent
Lui et al.

(10) Patent No.: US 10,973,366 B2
(45) Date of Patent: Apr. 13, 2021

(54) PORTABLE MILK FROTHER

(71) Applicant: PRAISE GLORY LIMITED, Hong Kong (CN)

(72) Inventors: Kam Ming Lui, Hong Kong (CN); Wing Kin Martin Hui, Hong Kong (CN)

(73) Assignee: THUNDER HOST LIMITED, Hong Kong (CN)

( * ) Notice: Subject to any disclaimer, the term of this patent is extended or adjusted under 35 U.S.C. 154(b) by 275 days.

(21) Appl. No.: 16/201,710

(22) Filed: Nov. 27, 2018

(65) Prior Publication Data

US 2019/0216257 A1    Jul. 18, 2019

(30) Foreign Application Priority Data

Jan. 18, 2018 (CN) .................................. 18100890.1

(51) Int. Cl.
*A47J 31/44* (2006.01)
*A47J 43/12* (2006.01)
*A47J 31/52* (2006.01)
*B01F 3/04* (2006.01)

(52) U.S. Cl.
CPC ....... *A47J 31/4489* (2013.01); *A47J 31/4496* (2013.01); *A47J 31/521* (2018.08); *A47J 43/126* (2013.01); *B01F 3/04* (2013.01); *B01F 3/04446* (2013.01)

(58) Field of Classification Search
CPC .. A47J 31/4489; A47J 31/521; A47J 31/4496; A47J 43/126; B01F 3/04; B01F 3/04446
USPC .......................... 99/290, 293, 452, 453, 460
See application file for complete search history.

(56) References Cited

U.S. PATENT DOCUMENTS

| 2,134,291 | A | * | 10/1938 | Schulz | ..................... | A61M 3/00 |
| | | | | | | 604/132 |
| 2007/0179448 | A1 | * | 8/2007 | Lim | ..................... | A61M 5/1452 |
| | | | | | | 604/187 |
| 2016/0030662 | A1 | * | 2/2016 | Uber, III | ............... | A61M 5/172 |
| | | | | | | 600/431 |

* cited by examiner

*Primary Examiner* — Phuong T Nguyen
(74) *Attorney, Agent, or Firm* — Weiss & Moy, P.C.; Jeffrey D. Moy

(57) ABSTRACT

A handheld cylinder (103) capable of containing hot water. The cylinder has a pump 105 for pressurised the headspace above the hot water with air. The cylinder (103) also has a spout (107) which can be open and closed by a valve (500). When the pressurised air which has been warmed by the hot water is released from the spout (107), the air can be directed into a body of milk to swirl the milk in its container (109) to cause frothing and foaming of the milk.

13 Claims, 7 Drawing Sheets

PORTABLE MILK FROTHER

FIELD OF INVENTION

The present invention relates to portable devices for frothing milk used in beverages.

BACKGROUND OF THE INVENTION

Frothed milk (milk with air bubbles incorporated) is often used in preparation of coffee or similar beverages. Incorporating air into the milk improves its taste. In contrast, milk that has not been frothed at all tends to taste flat. Traditionally, the way to froth milk is to whisk milk until it foams.

Machines for frothing milk has been invented and are popular in modern cafes. These machines basically provide a stream of warm steam at a temperature of about 60 degrees Celsius which can be blown into a mug of milk to create foaming. The temperature cannot be too hot in order to avoid denaturing the milk, which gives an egg-like taste. The user holds a mug of milk at an angle to the steam, such that the milk is swirl in the mug by the force of the steam. As the steam is injected into the whirling milk, air bubbles are formed and trapped in the milk, creating foam.

EP032929 entitled Automatic Device For Obtaining Frothy Milk discloses an automatic device with a complicated internal structure for mixing milk and steam. However, this device is not portable and is best used in a café. Another prior art document U.S. Pat. No. 7,600,467 entitled Automatic Apparatus For Heating And Frothing Milk discloses an industrial type milk frother which is also not portable.

A portable milk frothing device will be very useful for people who would like to enjoy a frothy cup of café au lait in a picnic, which is usually in an area that is open and natural, probably without facilities like a counter or electricity to use a milk frother. Presently, these picnic-ing people can only enjoy café au lait that has gone flat by the time they drink it, as the milk must have been frothed some time ago before they headed for the picnic area. The option of bringing a bowl and whisker with them to froth milk is not an elegant solution. Furthermore, the milk is preferably warm when frothed in order not to cool down the beverage into which it is mixed significantly.

Therefore, it is desirable to provide a portable device which is usable to provide a stream of warm stream of air or steam which is useable to forth milk.

SUMMARY OF THE INVENTION

In a first aspect, the invention proposes a portable milk frother comprising: cylinder having a first end and a second end, a piston connected to the first end for pumping air into the cylinder, a spout provided at the second end for discharge of contents in the cylinder, the spout having a first end and a second end, the first end being outside the cylinder and the second end extending substantially into the cylinder, the second end being open for entry of contents in the cylinder, the first end of the spout having holes dimensioned and position to dispersion the contents in the cylinder leaving through the spout, a discharge valve for controlling release of contents in the cylinder through the spout.

The cylinder can be filled with hot water so that air in the headspace above the water can be heated by the heat emanating from the water. The pump allows more air to be forced into the cylinder. Resultant pressurized air in the headspace can be released through the spout. By submerging the spout into a mug of milk, the milk can be swirl by the hot air to create frothing.

Preferably, the second spout end extending substantially to at least half the length of the inner space of the cylinder. This ensures that a substantial volume of hot water may be poured into the cylinder that can sufficient heat up air in the headspace over the hot water. Actually, the length of the second spout end may vary in different embodiments. Generally, the second spout end determines the maximum level of water in the cylinder without the water spilling over into the spout. Therefore, the shorter the second spout end, the greater the headspace provided and the less the amount of water which can be contained in the cylinder. Conversely, the longer the second spout end, the lesser the headspace provided and the more the amount of water which can be contained in the cylinder. Having more water in the cylinder allows for more hot water to heat a smaller volume of air, whereas having a greater headspace allows for more air to be pressurised and to be released over a longer period of time.

Preferably, the discharge valve is wirelessly controllable to open and close. The wireless control can be executed from a smart phone using wireless communication, such as Bluetooth™ or Wifi.

Preferably, the piston is removable. Furthermore, the spout is also preferably removable. A device which can be dismantled into these parts allow for greater ease of the washing and drying of these parts.

Preferably, the pump is provided with a pipe has a length that extends beneath the opening of the second spout end. This provides the possibility that the opening of the pipe is below the water level in the cylinder, and that the pump is able to introduce air into the water in the cylinder. This ensures a better exchange of heat between air and water to produce hot air in the headspace.

Preferably, the milk frother further comprises a wireless communication module for transmitting data relating to the temperature and/or the pressure of the headspace. Typically, the wireless communication module is a Bluetooth™ transceiver or a WiFi transceiver.

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

DETAILED DESCRIPTION OF EMBODIMENTS

Figure 1:
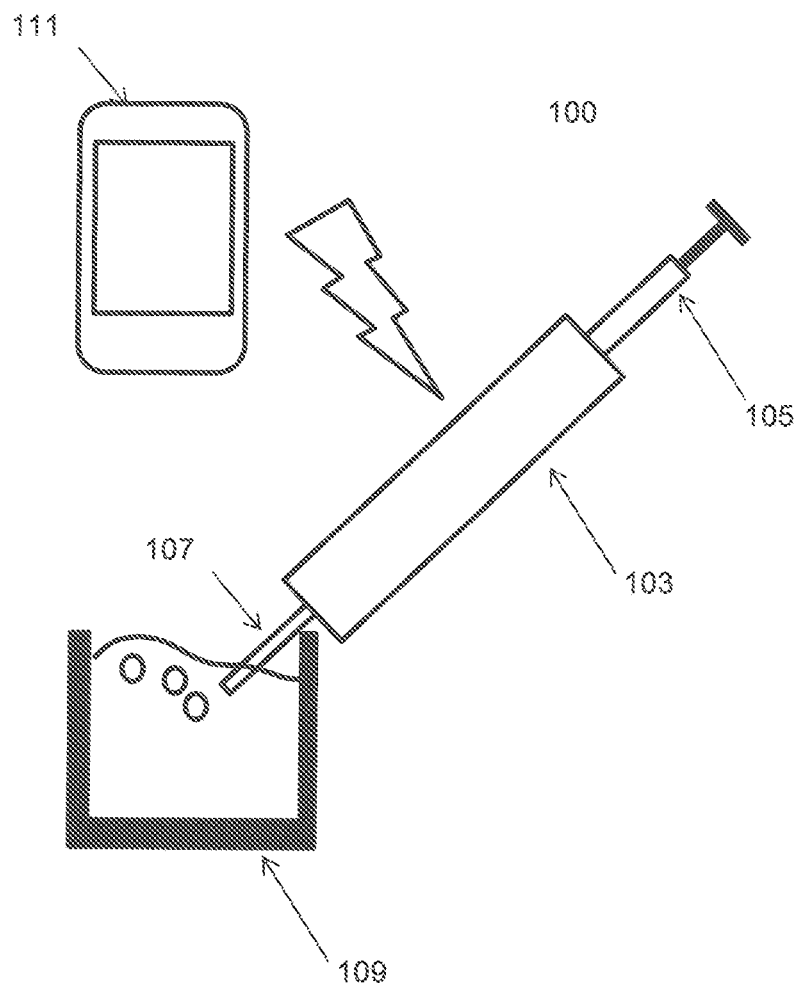
FIG. 1 is an illustrate of an embodiment of the invention.

FIG. 1 shows a first embodiment 100, which is basically a portable, handheld air spray device suitable for use as a milk frother 100. The milk frother 100 is useable to provide a stream of hot air to create foaming in milk for preparing beverages such as various forms of hot coffee and chocolate drinks.

The milk frother 100 comprises a cylinder 103. The top of the cylinder 103 as shown is provided with a piston 105 for pumping air into the cylinder 103 to create pressurised air. The bottom of the cylinder 103 is provided with a spout 107 for discharging cylinder content. FIG. 1 also shows how the spout is submerged into a cup of milk 109 to froth the milk. Air discharged from the spout into the milk whirls the milk and creates foam. To provide hot air, hot water is poured into the cylinder 103 before air in the cylinder 103 is pressured by the pump, as will be described in greater detail further on.

Figure 2:
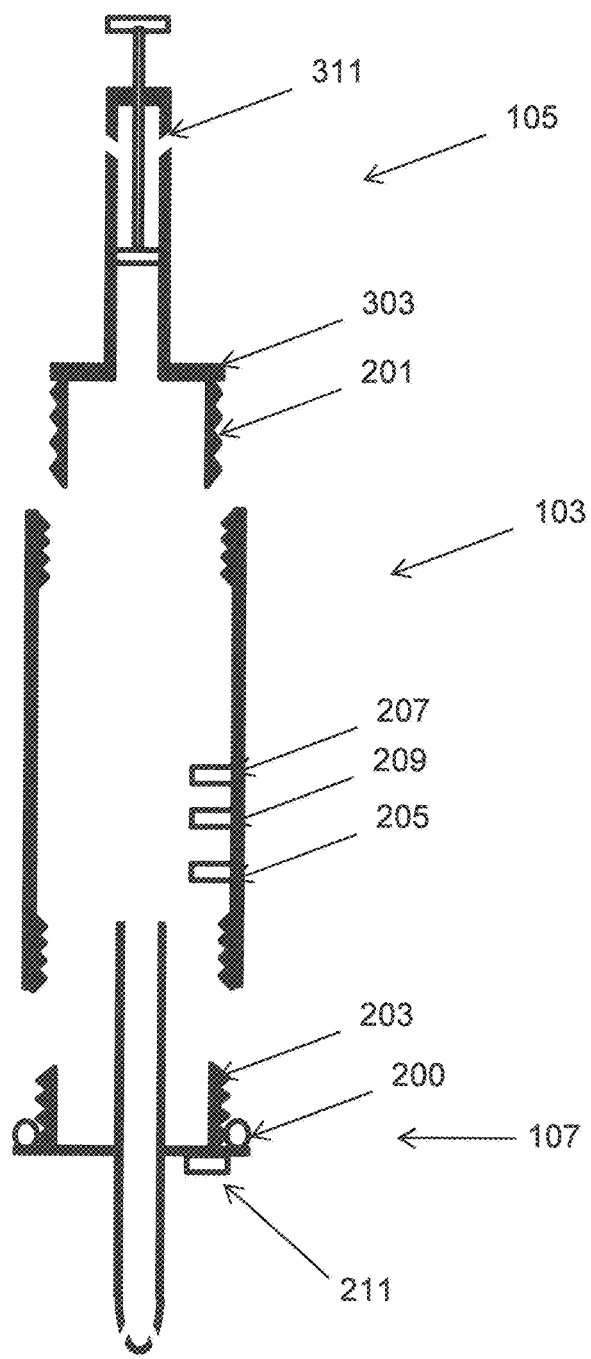
FIG. 2 illustrates an exploded cross-sectional view of an embodiment of FIG. 1.

FIG. 2 is a cross-sectional side view of the milk frother 100. The cylinder 103 provides the function of a manually operated compression chamber. The hand operable air pump 105, i.e. the piston, is connected to the top of the cylinder 103 as shown. Preferably, the handheld air pump 105 is removably connected to the cylinder 103 via screw-thread fitting 201. Preferably, the spout is also removably connected to the bottom of the cylinder 103 by screw thread fitting 203. The cylinder 103, when both handheld air pump 105 and spout are connected to it, provides an air-tight space in which air may be compressed.

Figure 3:
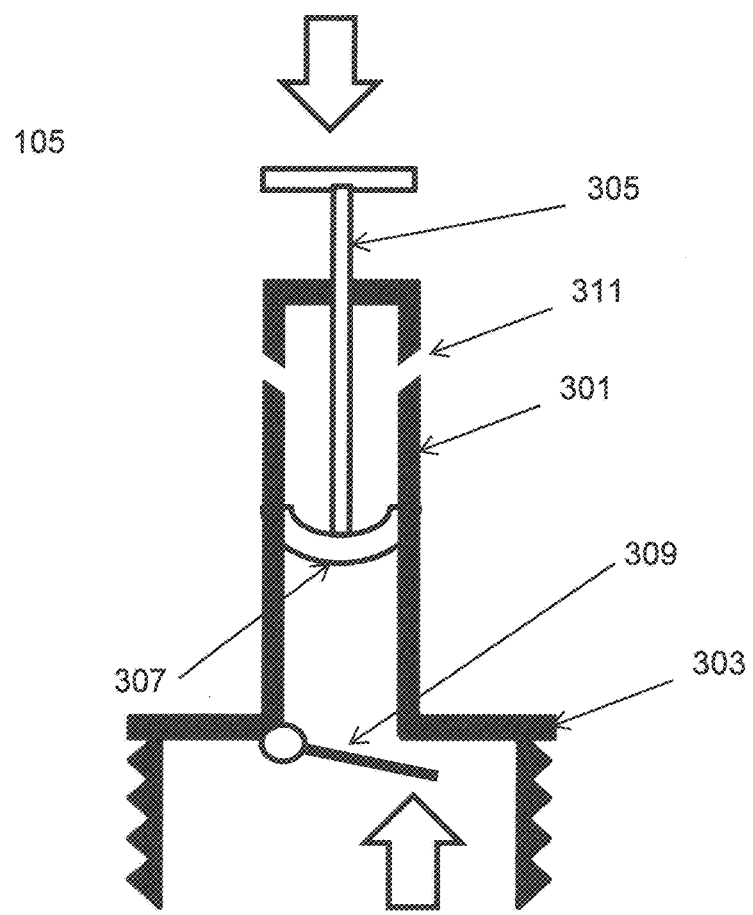
FIG. 3 is an enlarged view of the air pump shown in FIG. 2.

FIG. 3 is a close up view of the pump 105. The pump 105 comprises a tube 301 connected to a base plate 303 which is dimensioned to fit to and close over the cylinder 103 in an air-tight manner. A piston 305 having a head in form of a cup 307 acts as a plunger in the tube 301. Pushing on the piston will drive air in the tube 301 towards the direction of the push. A spring loaded one-way valve 309 is provided at the outlet of the tube 301. The one-way valve 309 is biased to open only when air is pushed past the one-way valve 309 into the cylinder 103, and blocks air moving in the reverse direction of the cylinder 103 back into the tube 301. Therefore, when the piston is pulled away from the one-way valve 309, the one-way valve 309 closes against the tube 301 and prevents content in the cylinder 103 from being sucked into the cylinder 103. This creates a vacuum inside the tube 301. At least one hole 311 is provided near the top end of the tube 301 distal from the one-way valve 309. If the cup at the end of the piston is pulled past the hole, the vacuum in the tube 301 is replaced by air from the surrounding atmosphere entering through the hole. Pushing on the piston again will drive air in the tube 301 past the one-way valve 309 and into the cylinder 103. In this way, the cylinder 103 can be filled with compressed air manually.

In other embodiments, a different construction of handheld air pump may be used and the described pump 105 does not limit the invention.

Figure 4:
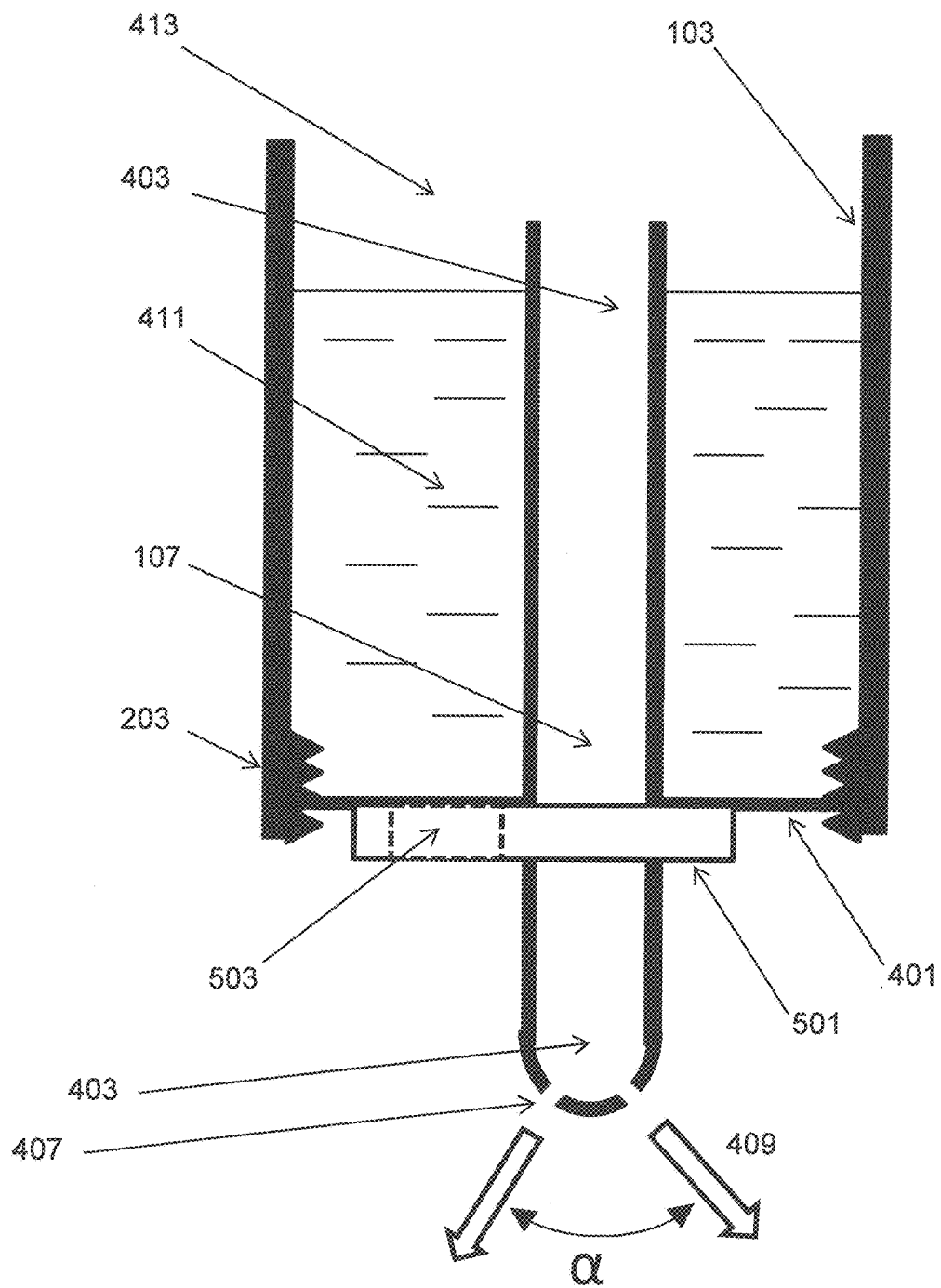
FIG. 4 is an enlarged view of the spout shown in FIG. 2.

FIG. 4 is a closed up view showing the spout 107 connected to the cylinder 103, demonstrating the operation of the portable milk frother 100. The screw-thread between the cylinder 103 and spout is air-tight. Preferably, rubber filler or similar material 200 (see FIG. 2) are provided between the cylinder 103 and spout to prevent leakage of fluid from the cylinder 103 when the contents in the cylinder 103 are under high pressure.

The spout 107 of the portable milk frother 100 comprises a base 401 which can be screwed onto the lower end of cylinder 103 as shown. The base 401 is round and shaped like a disc which is convenient for being screwed over the mouth of the cylinder 103. The spout 107 passes through the centre of the base 401, and extends a certain distance on either side of the base 401.

The length of the part of the spout which extends into the cylinder 103 determines the level of hot water which may be contained in the cylinder 103 without the water running over into the spout. This 'inner' end 403 of the spout is open to allow free flow of air and steam into the spout.

The other end 405 of the spout which is outside the cylinder 103 is closed except for a few holes 407 at the tip of the spout. The holes are arranged such that they each diverge fluid passing through them away from the axis of the spout, which form a spray 409 having an angle alpha ($\alpha$) whereby pressurised fluids dispelling through the holes are directed into diverging directions.

Figure 5:
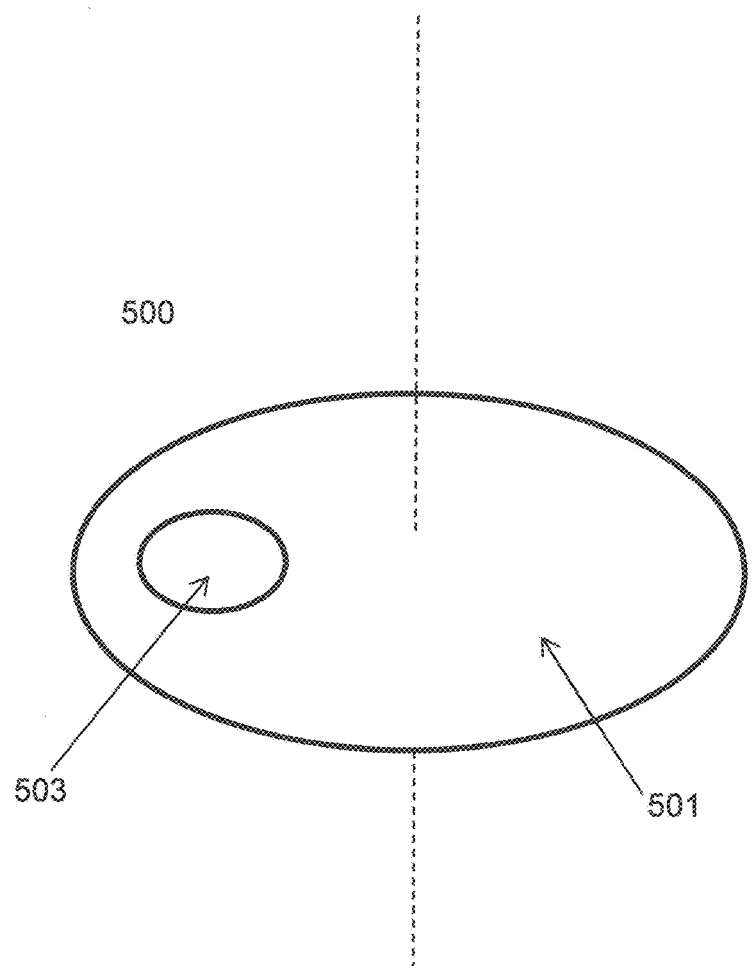
FIG. 5 is an illustration of a valve which is used to control the opening and closing of the spout of FIG. 4.

A discharge valve 500 is provided, which opens or closes the passage of fluid flow through the spout. In one embodiment, as demonstrated in FIG. 5, the discharge valve 500 is simply a round disc 501 with an off-centre hole 503. The size of the hole 503 matches the internal channel of the spout 107. The discharge valve 500 can be rotated about an axis running through the centre of the disc 501. The hole 503 in the disc may be moved into alignment with the spout 107 by rotating the disc, and so opens a passage for the contents in the cylinder 103 to be discharged. The disc 501 may be further rotated so that the discharge valve 500 is moved into misalignment with the spout 107 in order to close the passage and seal the cylinder 103.

To use the milk frother 100, the pump 105 on the cylinder 103 is firstly removed and the cylinder 103 is filled with hot water 411 almost up to the inner spout end 403 but falling short of spilling over into the spout. The pump 105 is then restored tightly over the cylinder 103 by screwing. The hot water 411 inside the cylinder 103 warms up the air in the headspace 413 above the hot water 411. The pump 105 is used to pump more air into the cylinder 103 manually, by moving the piston towards and away from the cylinder 103 repeatedly. When a desired pressure has built up in the cylinder 103, the discharge valve 500 is opened to allow the escape of the hot, pressurized air through the multiple holes in the spout. The holes cause the hot air to be dispelled in the form of an air spray, which contributes to creating bubbles in milk effectively.

In one embodiment, the temperature of water inside the cylinder 103 is of 80 degree Celsius or higher, and the desired pressure is 3 Bar (approximately 3 times 750.06 mmHg). However, other temperatures may be used as the user sees fit.

In variation of the embodiment, the cylinder 103 further comprises a temperature sensor 205, a pressure sensor 207 and a 'first' Bluetooth™ communication device 209. The temperature sensor 205 is used to measure the temperature of water inside the cylinder 103. Preferably, the temperature sensor 205 is installed closer to the bottom of the cylinder 103 than the top of the cylinder 103 in order to ensure contact with water. Conversely, the pressure sensor 207 is installed nearer the top of the cylinder, i.e. nearer the pump 105, in order to ensure measurement of the pressure of the headspace. Readings of the temperature and pressure inside the cylinder 103 are sent via the first Bluetooth™ communication device 209 to a software application running on a smart device 111, such as a smart phone or a portable computer tablet. In this way, the user is able to manage the temperature and pressure of the headspace.

Preferably, the disc of the discharge valve 500 is controlled by a step-motor installed into the cylinder, which is in turn controlled by a 'second' Bluetooth™ communication device 211 also installed into the cylinder. The second Bluetooth™ communication device 211 controls the step-motor to open and close the discharge valve 500. Preferably, when the pressure inside the cylinder 103 has been not built up to a pre-determined pressure, the discharge valve 500 cannot be opened, whether manually or by Bluetooth™ actuation. When the pressure inside the cylinder 103 reaches the pre-determined pressure, the software application in the smart device 111 permits the user to send a control signal to the second Bluetooth™ communication device 211 to open the discharge valve 500 electronically, which releases pressurized hot air through the spout 107. Alternatively, a visual or audio alarm is raised by the software application informing the user to operate the discharge valve 500 manually, or to use the smart device 111 manually to operate the discharge valve 500.

The steps to make froth milk by the portable milk frother 100 are as follow:
1. Install the spout 107 to the bottom of the cylinder 103 by screwing the base 401 holding the spout 107 over the bottom of the cylinder 103 to close the cylinder 103;
2. Ensure that the discharge valve 500 is switched into the closed position. This may be accomplished by switching the discharge valve 500 manually, or electronically by Bluetooth™ using a smart device 111.
3. Pour hot water into the cylinder 103. Preferably, the water has a temperature of 80 degree Celsius or higher, and the volume of water is about ⅕ of the capacity of the cylinder 103. For example, if the internal capacity of the cylinder 103 is 1000 ml, the hot water used is 200 ml. In a picnic, the user need only carry a thermos flask containing hot water to use with the embodiment.
4. Screw the handheld air pump 105 to the top of cylinder 103 to close the cylinder 103 hermetically.
5. Set the desired pressure on the software application running on the smart device 111. For example, the desired pressure may be set to 3 bar. The application running on the smart device 111 provides reading of the current temperature and pressure inside the cylinder 103.
6. Using the handheld air pump 105, the user manually pumps air into the cylinder 103 to increase the pressure of the headspace in the cylinder 103.
7. On detecting that the pressure of the headspace has reached the pre-determined level, the software application running on the smart device 111 operates the discharge valve 500 to open the passage through the spout 107 automatically.
8. When the spout 107 is opened, a spray of pressurized air and steam is released from the multiple holes of the tip of the spout 107. If the tip of the spout 107 is submerged below the surface of the milk, the mixing with air and spinning of the milk creates a frothing process.

Figure 6:
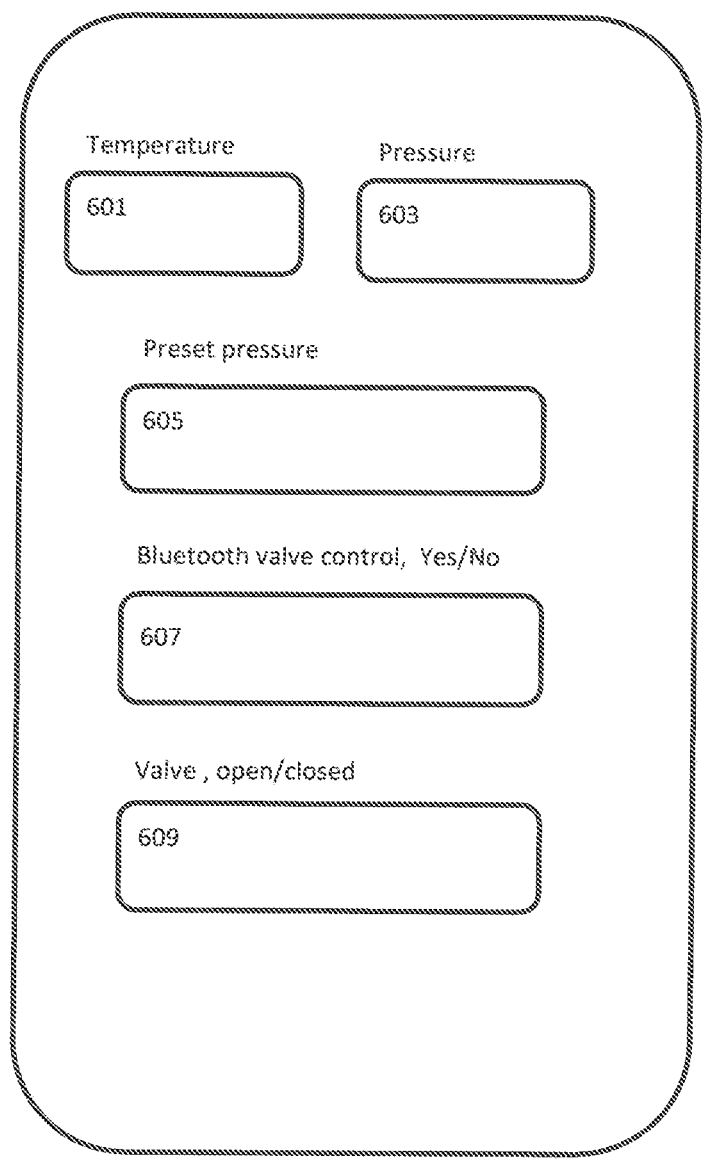
FIG. 6 is an illustration of the Interface of a smart phone application that may be used with the embodiment of FIG. 1.

FIG. 6 shows an example of the screen of the application running on a smart device 111. The screen shows in real-time the temperature 601 and pressure 603 inside the cylinder 103, allowing the user to set the desired pressure 605. The screen also allows the user to use the smart device 111 to control the opening and closing of the valve of the spout, 607, manually, or to control the valve from the smart device 111. The screen indicates at all times whether the valve is open or closed 609.

Figure 7:
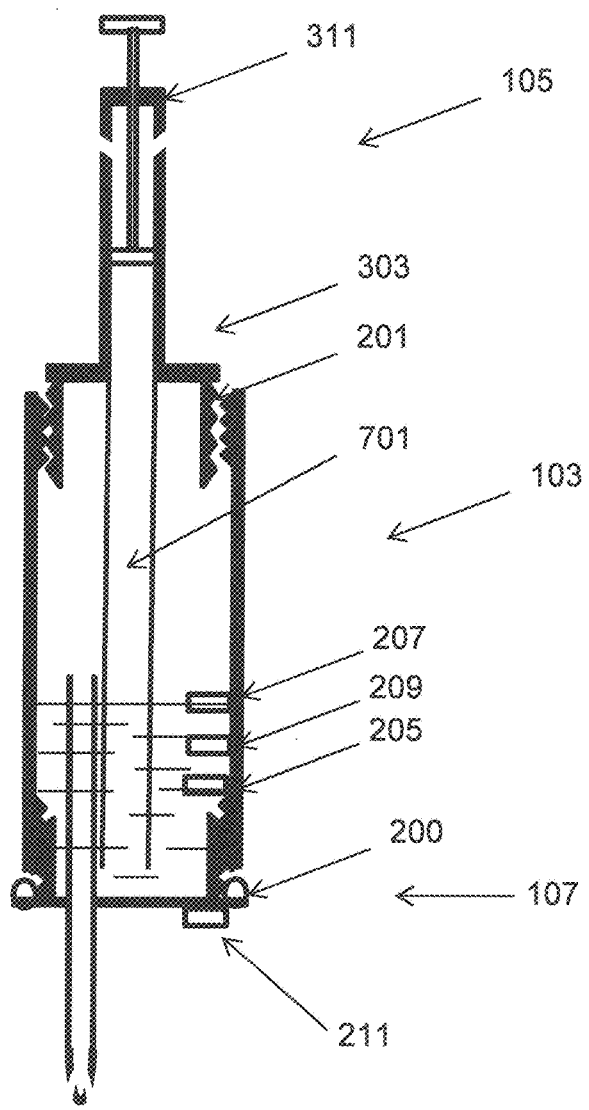
FIG. 7 shows another embodiment of the invention.

FIG. 7 shows a variation of the embodiment, wherein pump 105 is provided with a pipe 701 has a length that extends beneath the opening of the second spout 107, such that the pump 105 is able to introduce air into water contained in the cylinder 103. This improves exchange of heat between the hot water and the air in the headspace.

While there has been described in the foregoing description preferred embodiments of the present invention, it will be understood by those skilled in the technology concerned that many variations or modifications in details of design, construction or operation may be made without departing from the scope of the present invention as claimed.

For example, the cylinder is provided with a jacket that retards dissipation of heat into the surroundings.

Also, the pump can be a battery operated, portable pump.

The invention claimed is:

1. A milk frother comprising:
a cylinder having a first end and a second end;
a pump connected to the first end for pumping air into the cylinder to change a pressure in the cylinder to a desired level, wherein the pump comprises:
a baseplate forming an airtight closure over the first end of the cylinder;
a tube coupled to the baseplate;
a piston pushing air down the tube into the cylinder;
a one-way valve coupled to an exit of the tube forming a vacuum preventing contents in the cylinder from being drawn into the tube when the piston pulled away from the one-way valve; and
at least one opening formed in a too area of the tube allowing air to enter the tube when the piston is puled past the at least one opening;
a spout provided at the second end for discharge of contents in the cylinder;
the spout having
a first spout end and a second spout end, the first spout end being outside the cylinder and the second spout end extending into the cylinder;
the second spout end being open for entry of contents in the cylinder;
the first spout end of the spout having holes dimensioned and position to dispersion the contents in the cylinder leaving through the spout;
a discharge valve for controlling release of contents in the cylinder through the spout.

2. The milk frother as claimed in claim 1, wherein the second spout end extending at least half the length of the inner space of the cylinder.

3. The milk frother as claimed in claim 1, wherein the discharge valve is wirelessly controllable to open and close.

4. The milk frother as claimed in claim 3, further comprising a Bluetooth™ communication device coupled to the cylinder allowing a smart device to control the discharge valve.

5. The milk frother as claimed in claim 1, wherein the discharge valve is wirelessly controllable to open and close.

6. The milk frother as claimed in claim 1, wherein the pump is removable.

7. The milk frother as claimed in claim 1, wherein the spout is removable.

8. The milk frother as claimed in claim 1, further comprising a temperature sensor to monitor the temperature of the headspace in the cylinder.

9. The milk frother as claimed in claim 8, further comprising a wireless communication module for transmitting data relating to the temperature of the headspace.

10. The milk frother as claimed in claim 1, further comprising a pressure sensor to monitor the pressure of the headspace in the cylinder.

11. The milk frother as claimed in claim 10, further comprising a wireless communication module for transmitting data relating to the pressure of the headspace.

12. The milk frother as claimed in claim 1, wherein the holes on the first spout end of the spout are angled to expel the contents of the cylinder in diverging directions.

13. A milk frother comprising:
a cylinder having a first end and a second end;
a pump connected to the first end for pumping air into the cylinder to change a pressure in the cylinder to a desired level;
a spout provided at the second end for discharge of contents in the cylinder;
the spout having
a first spout end and a second spout end, the first spout end being outside the cylinder and the second spout end extending into the cylinder;
the second spout end being open for entry of contents in the cylinder;
the first spout end of the spout having holes dimensioned and position to dispersion the contents in the cylinder leaving through the spout, wherein the holes on the first spout end of the spout are angled to expel contents of the cylinder in diverging directions;
a discharge valve for controlling release of the contents in the cylinder through the spout.

* * * * *